(12) United States Patent
Krizan et al.

(10) Patent No.: US 12,010,092 B2
(45) Date of Patent: Jun. 11, 2024

(54) DISTRIBUTED AUTOMATIC MULTICAST ADDRESS ASSIGNMENT DEVICE AND METHOD

(71) Applicant: Panduit Corp., Tinley Park, IL (US)

(72) Inventors: Paul A. Krizan, Plano, TX (US);
Joshua C. Small, Medford, OR (US);
Ronald Cheng, San Francisco, CA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/828,517

(22) Filed: May 31, 2022

(65) Prior Publication Data

US 2022/0417212 A1 Dec. 29, 2022

Related U.S. Application Data (60) Provisional application No. 63/202,793, filed on Jun. 24, 2021.

(51) Int. Cl.
*H04L 61/5046* (2022.01)
*H04L 61/5069* (2022.01)
*H04L 61/5092* (2022.01)
*H04N 21/6405* (2011.01)

(52) U.S. Cl.
CPC ...... *H04L 61/5046* (2022.05); *H04L 61/5069* (2022.05); *H04L 61/5092* (2022.05); *H04N 21/6405* (2013.01)

(58) Field of Classification Search
CPC ............. H04L 61/5046; H04L 61/5092; H04L 61/5069; H04N 21/6405
See application file for complete search history.

(56) References Cited

U.S. PATENT DOCUMENTS

| | | |
|---|---|---|
| 5,835,723 A | 11/1998 | Andrews et al. |
| 6,018,771 A | 1/2000 | Hayden |
| 6,147,992 A | 11/2000 | Giroir et al. |
| 6,249,814 B1 | 6/2001 | Shaffer et al. |
| 6,501,763 B1 | 12/2002 | Bhagavath et al. |
| 6,567,929 B1 | 5/2003 | Bhagavath et al. |
| 6,977,929 B1 | 12/2005 | Caronni et al. |
| 7,558,846 B2 | 7/2009 | Gu et al. |
| 7,602,756 B2 | 10/2009 | Gu et al. |
| 7,716,356 B2 | 5/2010 | Bauman et al. |

(Continued)

OTHER PUBLICATIONS

Kakhbod et al. "An Efficient Game Form for Multi-Rate Multicast Service Provisioning", IEEE Journal on Selected Areas in Communications, vol. 30, Issue 11, Dec. 2012, IEEE Pulbiishing.*

(Continued)

*Primary Examiner* — Todd L Barker
(74) *Attorney, Agent, or Firm* — Christopher S. Clancy; James H. Williams; Peter S. Lee (57) ABSTRACT

A solution is disclosed for providing automatic multicast address assignment and conflict resolution for AV streams multicast over a networked AV system. The solution includes a device for monitoring the system for messages associated with AV streams multicast over the system and implementing a conflict resolution protocol when a conflict of multicast addresses is detected, where the conflict resolution protocol utilizes automatically randomly selecting a preliminary multicast address from a defined range of addresses.

18 Claims, 4 Drawing Sheets

(56) References Cited

U.S. PATENT DOCUMENTS

| | | | |
|---|---|---|---|
| 7,912,049 B2 | 3/2011 | Gutknecht et al. | |
| 8,116,336 B2 | 2/2012 | Jing et al. | |
| 8,441,963 B2 | 5/2013 | Bahnck et al. | |
| 8,848,590 B2* | 9/2014 | Kakani | H04L 12/185 |
| | | | 370/312 |
| 9,338,221 B2* | 5/2016 | Petit-Huguenin | |
| | | | H04L 12/1827 |
| 9,462,308 B2 | 10/2016 | Labosco et al. | |
| 9,832,168 B2 | 11/2017 | Kloberdans et al. | |
| 9,961,350 B2 | 5/2018 | McCarthy et al. | |
| 2002/0116520 A1 | 8/2002 | Hayden | |
| 2003/0106065 A1 | 6/2003 | Sakai et al. | |
| 2007/0064696 A1 | 3/2007 | Min | |
| 2008/0095183 A1* | 4/2008 | Bijwaard | H04L 12/185 |
| | | | 370/432 |
| 2010/0125353 A1* | 5/2010 | Petit-Huguenin | |
| | | | H04L 12/2854 |
| | | | 709/236 |
| 2014/0068690 A1* | 3/2014 | Luthra | H04N 21/4363 |
| | | | 725/110 |
| 2014/0211801 A1 | 7/2014 | Trainin et al. | |
| 2014/0355605 A1* | 12/2014 | Gouache | H04L 12/2838 |
| | | | 370/390 |
| 2015/0095486 A1 | 4/2015 | Gossain et al. | |
| 2017/0080346 A1* | 3/2017 | Abbas | A63F 13/79 |
| 2019/0166407 A1* | 5/2019 | Sajassi | H04N 21/222 |
| 2020/0036760 A1* | 1/2020 | Lavoie | H04L 65/1066 |

OTHER PUBLICATIONS

Anonymous: "Zero-configuration networking—Wikipedia"; Jan. 30, 2018 (Jan. 30, 2018); XP55589735; Retrieved from the Internet: URL:https://en.wikipedia.org/w/index.php?title=Zero-configuration_networking&oldid=8 23148787; [retrieved on May 17, 2019]; 11 pgs.

Yonghang Yan et al: "A Novel IP Address Auto-Configuration Scheme for MANET with Multiple Gateways", 2012 8th International Conference on Wireless Communications, Networking and Mobile Computing (Wicom 2012); Shanghai, China; Sep. 21-23, 2012; IEEE, Piscataway, NJ, Sep. 21, 2012 (Sep. 21, 2012), pp. 1-6, XP032342553, DOI: 10.1109/WICOM.2012.6478332 ISBN: 978-1-61284-684-2; 6 pgs.

* cited by examiner

DISTRIBUTED AUTOMATIC MULTICAST ADDRESS ASSIGNMENT DEVICE AND METHOD

CROSS-REFERENCE TO RELATED APPLICATION(S)

This application claims benefit to U.S. Provisional Patent Application No. 63/202,793, filed on Jun. 24, 2021, the entirety of which is hereby incorporated by reference herein.

TECHNICAL FIELD

The following relates to a device and method for distributed automatic multicast address assignment and conflict resolution in a networked audio-visual (AV) system.

BACKGROUND

Networked AV systems rely on commonly available Ethernet switches to carry encoded audio and video from a source, such as a personal computer (PC), set-top-box (STB), or Blu-Ray player, to a destination, such as a display or projector. Because the switching infrastructure is not a dedicated AV system, the encoders need to be configured to send AV content to the network and the decoders need to be configured to correctly receive that content. Furthermore, the network switch itself needs to be sufficiently capable of managing the large amounts of traffic generated by AV sources, and they need to be correctly configured to send that traffic to decoders that request it.

The misconfiguration of encoders and decoders is one of the most common problems seen in networked AV installations. While many of these issues can be avoided through the use of "sane defaults" or devices that adapt to changes in the sources or displays so that installers do not need to configure them, one area that requires manual configuration is the multicast address of the encoded streams. If the multicast address is not configured correctly, or if it conflicts with another address on the network, the audio and video streams will not be able to be received and correctly decoded.

Three alternative approaches are currently used to handle configuration of multicast addresses on encoders and decoders. According to the first approach, the installer defines the multicast address for each stream manually and enters them into each encoder. The challenge of this approach is that the installer must ensure that each stream is given a unique address, and so they must have a way to keep track of multicast addresses and be sure those addresses are entered correctly into each unit. This has tended to result in the creation of cumbersome and resource intensive spreadsheet tools for managing the tracking of multicast addresses.

According to the second approach, the networked AV equipment manufacturer creates a software tool that runs on the installer's laptop and centrally configures the units. The software can automatically assign addresses over a range and further notify the installer if there are any conflicts detected. The challenge of this approach is that the installer must use software to configure the encoders and decoders, and device replacement introduces a variable that needs to be carefully addressed when using external software.

According to the third approach, the networked AV equipment manufacturer creates a software tool that runs on a server to monitor and manage the equipment. This software can automatically assign addresses over a range and further notify the installer and system administrator if any conflicts are detected. Unlike the aforementioned software solution of the second approach, this software is always available, and should be able to handle any device replacements. The downside to this approach is that the server and the software are required to be installed and maintained for this configuration to occur. This is oftentimes not an option during installation of the AV infrastructure equipment (of which encoders and decoders are a part).

A need therefore exists for a system, apparatus, method, and non-transitory computer readable medium for distributed automatic multicast address assignment in a networked AV system that would solve, address, eliminate and/or mitigate some or all of the problems and/or issues associated with the current approaches described above.

SUMMARY

According to one non-limiting exemplary embodiment described herein, an encoder is provided for automatic multicast address assignment and conflict resolution for AV streams multicast over a networked AV system, the encoder being associated with a source for generating an AV stream. The encoder comprises a controller and a memory in communication with the controller, the memory comprising a non-transitory computer readable storage medium having stored executable instructions. Execution of the instructions by the controller may cause the encoder to implement any one or more of the features described herein. For example, execution of the instructions may cause the controller to (a) monitor the networked AV system for messages associated with AV streams multicast over the networked AV system; (b) build a table in the memory, the table having a multicast address associated with each AV stream multicast over the networked AV system based on the messages associated with the AV streams; (c) automatically randomly select a preliminary multicast address from a defined range of addresses; (d) compare the preliminary multicast address selected to the multicast addresses in the table; (e) repeat (c) when the preliminary multicast address selected conflicts with a multicast address in the table; and (f) automatically assign the preliminary multicast address selected for association with the AV stream generated by the source associated with the encoder when the preliminary multicast address selected does not conflict with a multicast address in the table.

According to another non-limiting exemplary embodiment described herein, a method is provided for automatic multicast address assignment and conflict resolution for AV streams multicast over a networked AV system, the method performed by an encoder associated with a source for generating an AV stream, the encoder having a controller and an associated memory. The method may comprise (a) monitoring the networked AV system for messages associated with AV streams multicast over the networked AV system; (b) building a table in the memory, the table having a multicast address associated with each AV stream multicast over the networked AV system based on the messages associated with the AV streams; (c) automatically randomly selecting a preliminary multicast address from a defined range of addresses; (d) comparing the preliminary multicast address selected to the multicast addresses in the table; (e) repeating (c) when the preliminary multicast address selected conflicts with a multicast address in the table; and (f) assigning the preliminary multicast address selected for association with the AV stream generated by the source associated with the encoder when the preliminary multicast address selected does not conflict with a multicast address in the table.

According to another non-limiting exemplary embodiment described herein, a decoder is provided for automatically joining an AV stream multicast over a networked AV system, the decoder associated with a destination for receiving an AV stream. The decoder may comprise a controller and a memory in communication with the controller, the memory comprising a non-transitory computer readable storage medium having stored executable instructions. Execution of the instructions by the controller may cause the decoder to implement any one or more of the features described herein. For example, execution of the instructions may cause the controller to monitor the networked AV system for messages associated with AV streams multicast over the networked AV system, build a list in the memory, the list including a name and an associated multicast address for each AV stream multicast over the networked AV system based on the messages associated with the AV streams, and automatically join an AV stream having a name found in the list based on the associated multicast address.

According to another non-limiting exemplary embodiment described herein, a method is provided for automatically joining an AV stream multicast over a networked AV system, the method performed by a decoder associated with a destination for receiving an AV stream. The method may comprise monitoring the networked AV system for messages associated with AV streams multicast over the networked AV system, building a list including a name and an associated multicast address for each AV stream multicast over the networked AV system based on the messages associated with the AV streams, and automatically join an AV stream having a name found in the list based on the associated multicast address.

A detailed description of these and other non-limiting exemplary embodiments of a device and method for distributed automatic multicast address assignment in a networked AV system is set forth below together with accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art. Furthermore, although exemplary embodiments include an encoder or decoder implementing the features described herein, it is within the scope of this disclosure for the features to be implemented by another device connected to the networked AV system. The device connected to the AV system for implementing the features described herein is a solution having such capability (e.g., hardware, software, and/or circuitry) to do so.

With reference to FIGS. 1-4, a more detailed description of non-limiting exemplary embodiments of a solution that may include a system, device, and/or method for distributed automatic multicast address assignment in a networked AV system will be provided. For ease of illustration and to facilitate understanding, like reference numerals may be used herein for like components and/or features throughout the drawings.

As previously described, a need exists for a system, device, and method for distributed automatic multicast address assignment in a networked AV system that solves, addresses, eliminates and/or mitigates some or all of the problems and/or issues associated with the current management approaches described above.

A network device or unit of the present disclosure, such as an AV encoder or decoder, may be configured to automatically assign a multicast address, detect any address conflicts, and/or resolve conflicts to thereby allow a networked AV system to be installed and set up more efficiently and with greater accuracy. In that regard, the devices of the present disclosure may be configured to provide a method of automation which may comprise one or more of three parts: (i) Automatic Multicast Address Assignment; (ii) Stream Conflict Detection; and (iii) Join by Stream Name.

As described herein, in general, devices of the present disclosure may be configured to automatically assign their multicast addresses, automatically detect any address conflicts, and/or automatically resolve those conflicts so that a networked AV system can be set up and operated with minimal configuration. This automatic assignment and conflict resolution occur in a distributed manner using the devices themselves so that no additional server software or server hardware is required to configure the devices.

In that regard, while the previously described centralized management approach using a network server provides for automatic address assignment, to implement distributed automatic address assignment as described herein, the present disclosure also provides devices (e.g., encoders and/or decoders) configured to individually identify and resolve address conflicts and/or to enable joining by stream name. Furthermore, while centralized management approaches may include functions such as listening and creating address lists, the present disclosure provides a novel distributed system and method for assigning new addresses as needed which are incorporated into address conflict resolution techniques. That is, the present disclosure implements a distributed system and method that automatically assigns addresses, automatically checks for address conflicts, and/or automatically resolves any conflicts that arise. The parts which may comprise this automation scheme of the present disclosure are described in the following description.

Automatic Multicast Address Assignment

Figure 1:
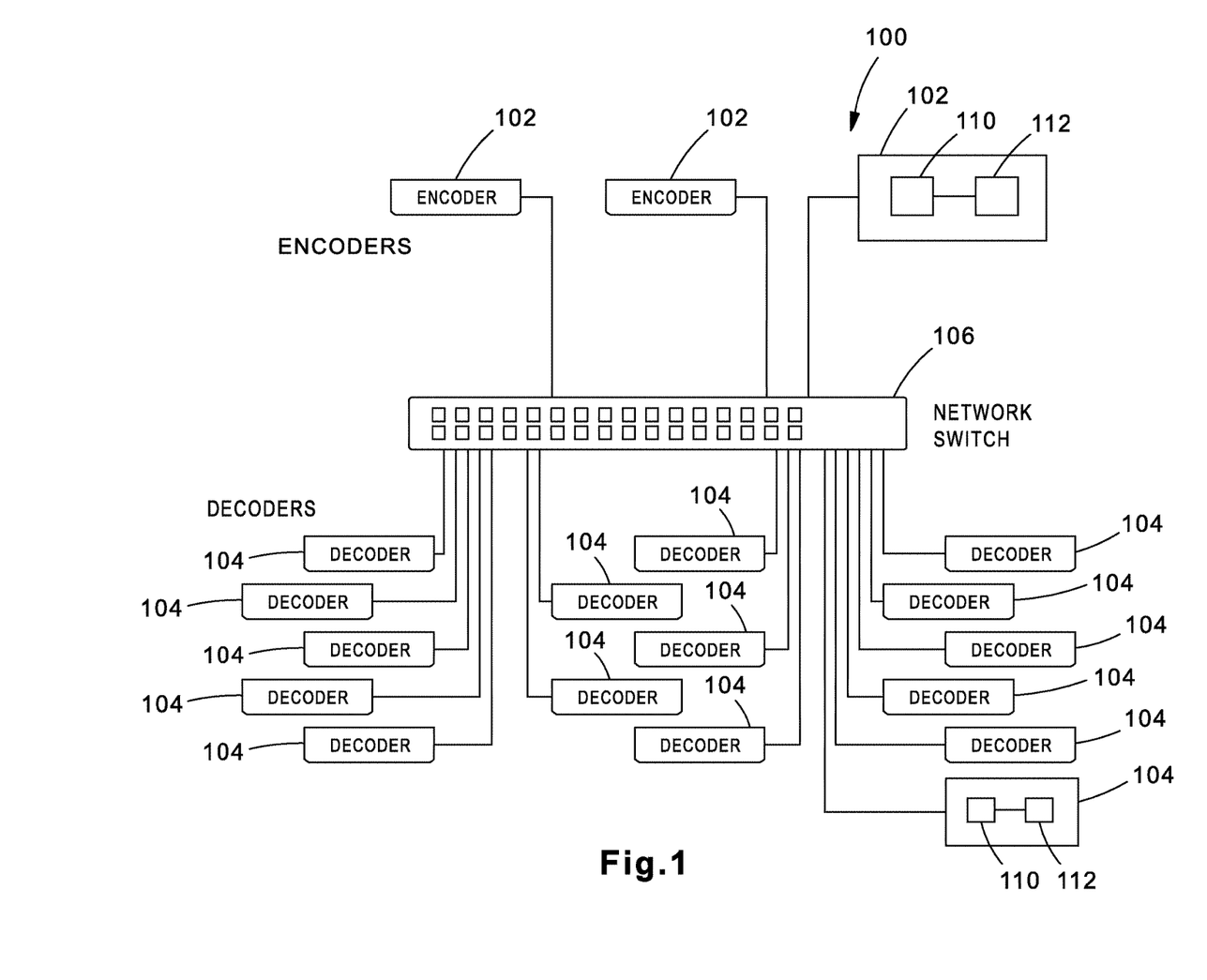
FIG. 1 is a simplified block diagram of an exemplary networked AV system for distributed automatic multicast address assignment according to one non-limiting exemplary embodiment of the present disclosure.

FIG. 1 is a simplified block diagram of an exemplary networked AV system environment for distributed automatic multicast address assignment according to one non-limiting exemplary embodiment of the present disclosure. As seen therein, a networked AV system 100 comprises encoders 102 that may be representative of, or in communication with, AV source devices such as a personal computer (PC), set-top-box (STB), or Blu-Ray player. The encoders 102 are in communication with decoders 104 that may be representative, or in communication with, destination devices such as a display or projector, through a switch 106 (e.g., ethernet/network switch). In that regard, the encoders 102 and decoders 104 may be in communication with the switch 106 and each other via any type of wired or wireless connection (e.g., ethernet connection) and may be appropriately configured to enable and/or establish any such connection or connections, such as via suitable cabling as shown in FIG. 1.

As also seen therein, each encoder 102 and decoder 104 may be a known encoder or decoder device including the hardware, software, and circuitry to operate in a networked AV system 100 as described herein. For example, the encoder 102 and the decoder 104 may comprise or include a controller 110 (which may comprise a processor) and a memory or data storage medium 112 which may comprise a machine (e.g., computer) readable storage medium. The data storage medium 112 is in communication with the controller 110 and stored on the data storage medium 112 are machine readable instructions that are executable by the controller 110. The machine-readable instructions stored on the data storage medium 112 may include stored operating system software and/or application software executable by the controller 110 for controlling operation thereof and for performing the particular algorithms/processes represented by the various functions and/or operations shown and described herein, including interaction and/or communication between and/or cooperation with each other.

Because the switching infrastructure may not be a dedicated AV system, the encoders 102 are be configured to send AV content to the network, and the decoders 104 are configured to correctly receive that content. The encoder 102 of the present disclosure is configured to automatically assign the Multicast Address of each AV stream using a random assignment mechanism to reduce the possibility of conflicts. In most installations, the users will not be concerned with the stream address; they will be more concerned with the stream name. As a result, the encoder 102 is configured to broadcast an SAP (Session Announcement Protocol) message with information about the stream name and address so that decoders 104 can determine which stream to join based on the selected name.

Figure 2:
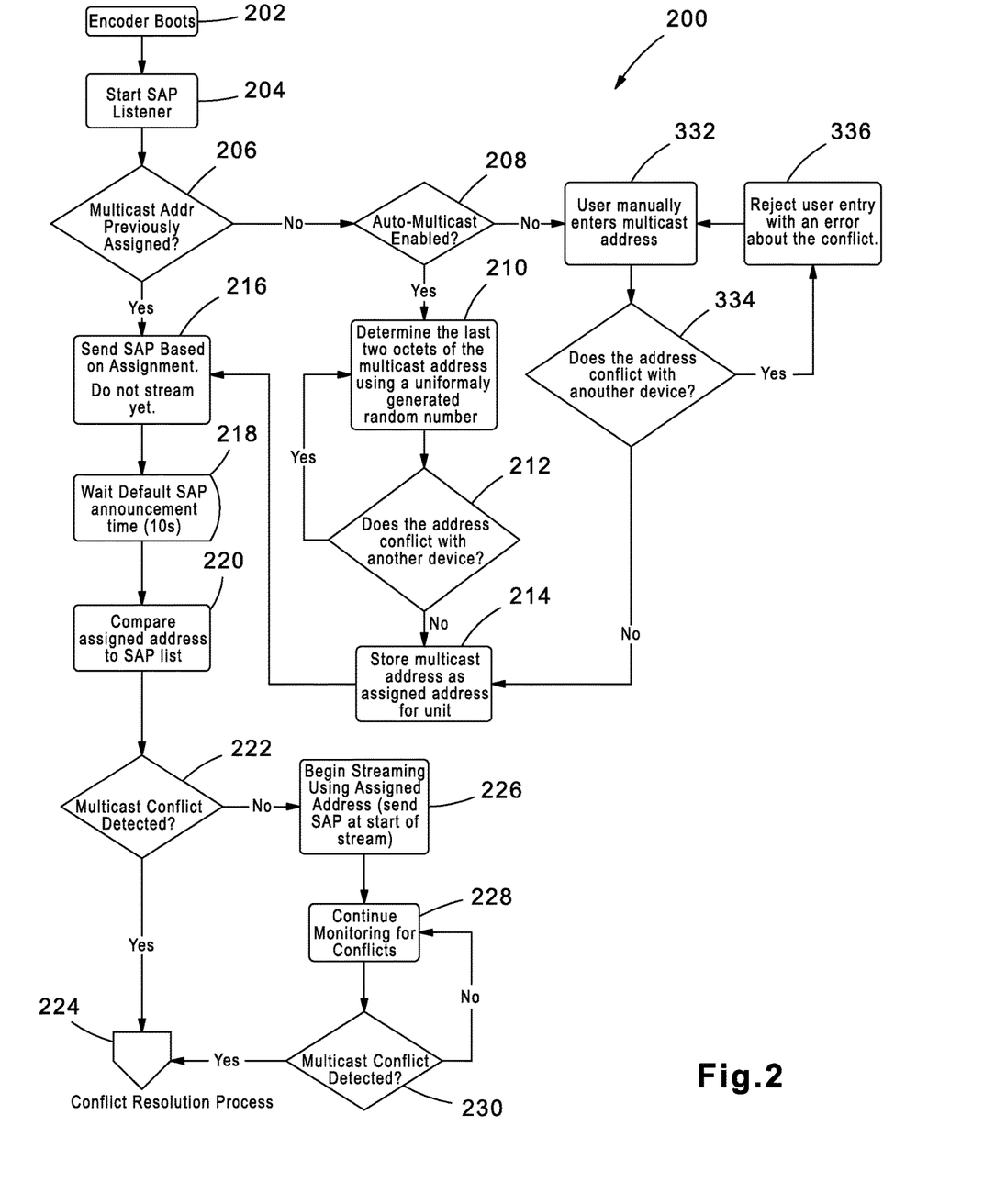
FIG. 2 is an exemplary flowchart illustrating an exemplary process for distributed automatic multicast address assignment according to one non-limiting exemplary embodiment of the present disclosure.

FIG. 2 is an exemplary flowchart 200 illustrating an exemplary process for distributed automatic multicast address assignment according to one non-limiting exemplary embodiment of the present disclosure. As seen therein, and with continuing reference to the networked AV system 100 from FIG. 1, in an exemplary embodiment according to the present disclosure, the encoders 102 may be configured to include an "Automatic Multicast Address Assignment" process as described by the flowchart 200.

As an initial process, a unit (e.g., an encoder 102) within the networked AV system 100 may initiate a booting up process (202). For example, the booting process may be implemented when a new encoder 102 is being added to the networked AV system 100 for the first time, or when the encoder 102 is being restarted.

After the encoder 102 implements the booting up process (202), the encoder 102 may be configured to listen for SAP announcements to build a table of streams and addresses (204). If the encoder 102 has never had a multicast address previously assigned (206) and automatic multicast address assignment is enabled (208), the encoder 102 is configured to automatically randomly select an address from a defined range (210), and automatically check the selected address against used addresses (212). If the check of the selected address indicates that the selected address is used (212), the encoder 102 is configured to again automatically select a new random address (210), and again automatically check 212 the new selected address against used addresses (212).

Alternatively, if the selected address is unused, the encoder 102 is configured to store the selected address as the assigned address for that encoder 102 (214), transmit an SAP announcement (216), and wait a default/predetermined SAP announcement time period or length (218). Before streaming, the encoder 102 is also configured to automatically compare the stored assigned address to an existing and dynamically updated address list (220). If a multicast address conflict is detected (222), the encoder 102 is configured to automatically execute a conflict resolution process or algorithm (224). Alternatively, if no conflict is detected (222), the encoder 102 is configured to begin streaming using the assigned address (226) and continue monitoring for address conflicts (228). If no conflict is detected (230), the encoder 102 is configured to continue monitoring for address conflicts (228). Alternatively, if a conflict is detected (230), the encoder 102 is configured to automatically execute a conflict resolution process or algorithm (224).

If a unit (e.g., an encoder 102) previously had a multicast address assigned (either via manual or automatic assignments), then that address is used unless a conflict is detected. The devices (encoder 102, decoder 104) of the present disclosure thus may ensure that a fully installed networked AV system 100 does not change.

Stream Conflict Detection

Figure 3:
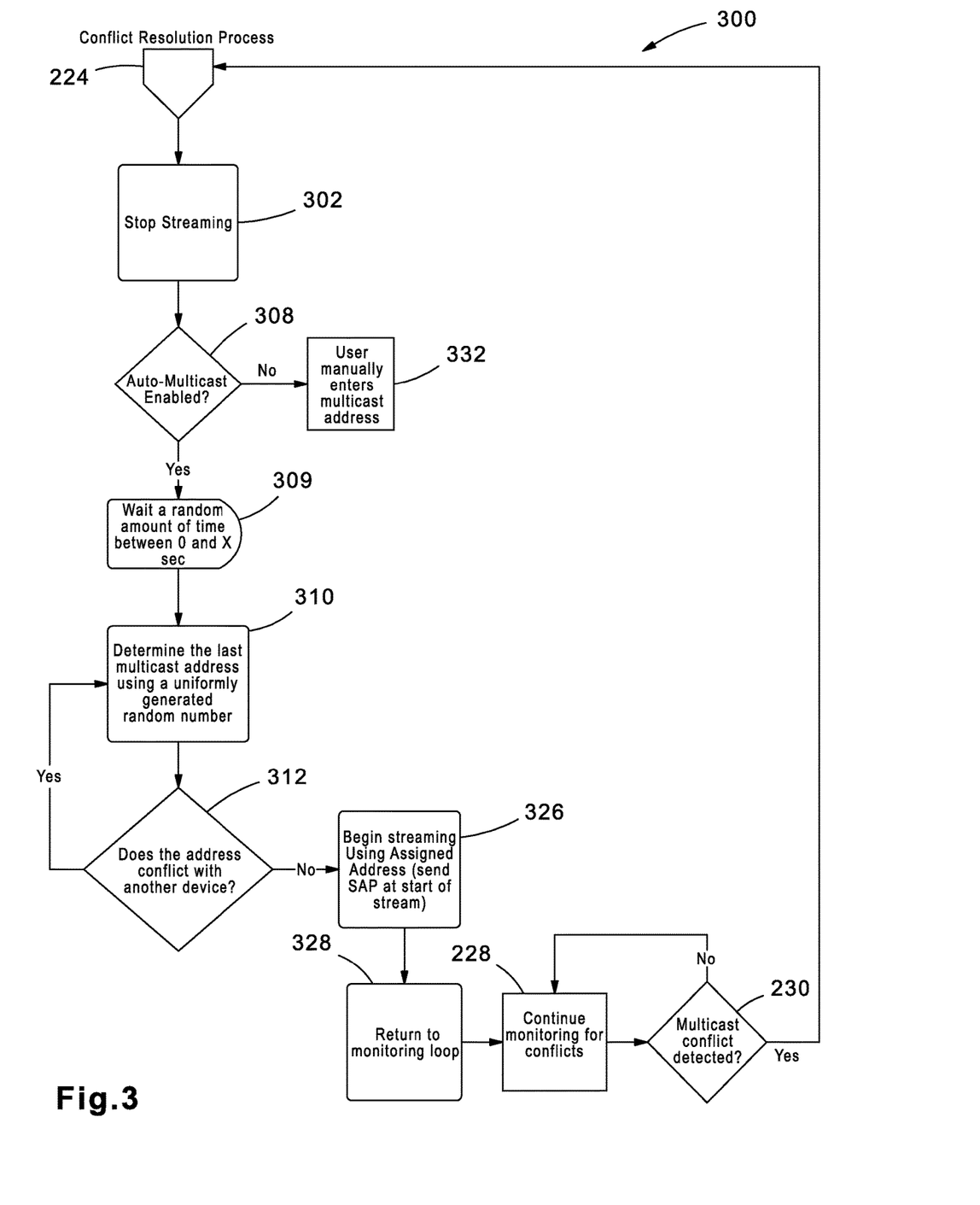
FIG. 3 is an exemplary flowchart illustrating an exemplary process for distributed automatic stream conflict detection and resolution according to one non-limiting exemplary embodiment of the present disclosure.

According to the present disclosure, to enable distributed assignment, encoders 102 may be configured to automatically check for address conflicts and automatically resolve those conflicts while also avoiding conditions that cause encoders 102 to constantly changes addresses. FIG. 3 is an exemplary flowchart 300 illustrating an exemplary algorithm for distributed automatic stream conflict detection and resolution according to one non-limiting exemplary embodiment of the present disclosure. As seen therein, and with continuing reference to the components/features disclosed in FIG. 1 and FIG. 2, in an exemplary embodiment according to the present disclosure, the encoders 102 may be configured to include a "Stream Conflict Detection" process described by the flowchart 300.

As previously described, after a unit (e.g., an encoder 102) implements a booting process (202), the encoder 102 may be configured to implement an SAP listener for listening for SAP announcements (204). In one embodiment, the encoder 102 is configured to automatically look for conflicts (222), (230) on not only multicast address, but also stream name. In that regard, if a conflict is detected (222), (230) on a multicast address, the encoder 102 is configured to run the conflict resolution routine (224). In that event, the encoder 102 is configured to first stop streaming (302). If the previously described "Automatic Multicast Address Assignment" process described by the flowchart 200 is enabled (308), the encoder 102 is configured to first wait a random amount of time (309). The encoder 102 is configured to automatically randomly select an address from a predefined range (310), and automatically check the selected address against used addresses identified in the address list (312). If the check of the selected address indicates that the selected address is used (312), the encoder 102 is configured to again automatically select a new random address (210), and again automatically check the new selected address against used addresses from the address list (312). Alternatively, if the selected address is unused, the encoder 102 is configured to begin streaming (326) and return (328) to monitoring (228) and checking (230) for multicast address conflicts.

In that same regard, if there is a name conflict when a user manually enters a name via a human-machine interface (HMI) device or an input/output (I/O) device (e.g., a keypad and screen), the encoder 102 may be configured to suggest a new name (e.g., the entered name+a number), and to present a message to a user via the HMI or I/O device allowing the user to accept the new name or edit the previously entered name. Alternatively, if there is a name conflict and the user is not entering a name, the encoder 102 may be configured to activate an alarm.

Still referring to FIGS. 1-3, when the previously described "Automatic Multicast Address Assignment" process described by the flowchart 200 is disabled (308), if the user is entering a multicast address (332) and the encoder 102 detects a multicast address conflict (334), the encoder 102 may be configured to reject the address entered by the user (336). In that regard, the encoder 102 may be configured to show an error message to the user on a screen (e.g., that an address conflict exits), and to make the user select a new address. Similarly, if a name conflict is detected by the encoder 102 when the user is entering a name, the encoder 102 may be configured to show a message to the user on the screen suggesting a new name (e.g., the entered name+a number), and allowing the user to accept the new name or edit the name. Alternatively, if there is a name conflict and the user is not entering a name, the encoder 102 may be configured to throw an alarm.

Join by Stream Name

As mentioned above, the decoders 104 may be configured to join by stream name so that installers and users can select a stream based on its name without having to know the multicast address (which is randomly assigned and subject to change). Furthermore, the decoders 104 may be configured to detect changes to the multicast address for a stream and automatically move to that new address.

Figure 4:
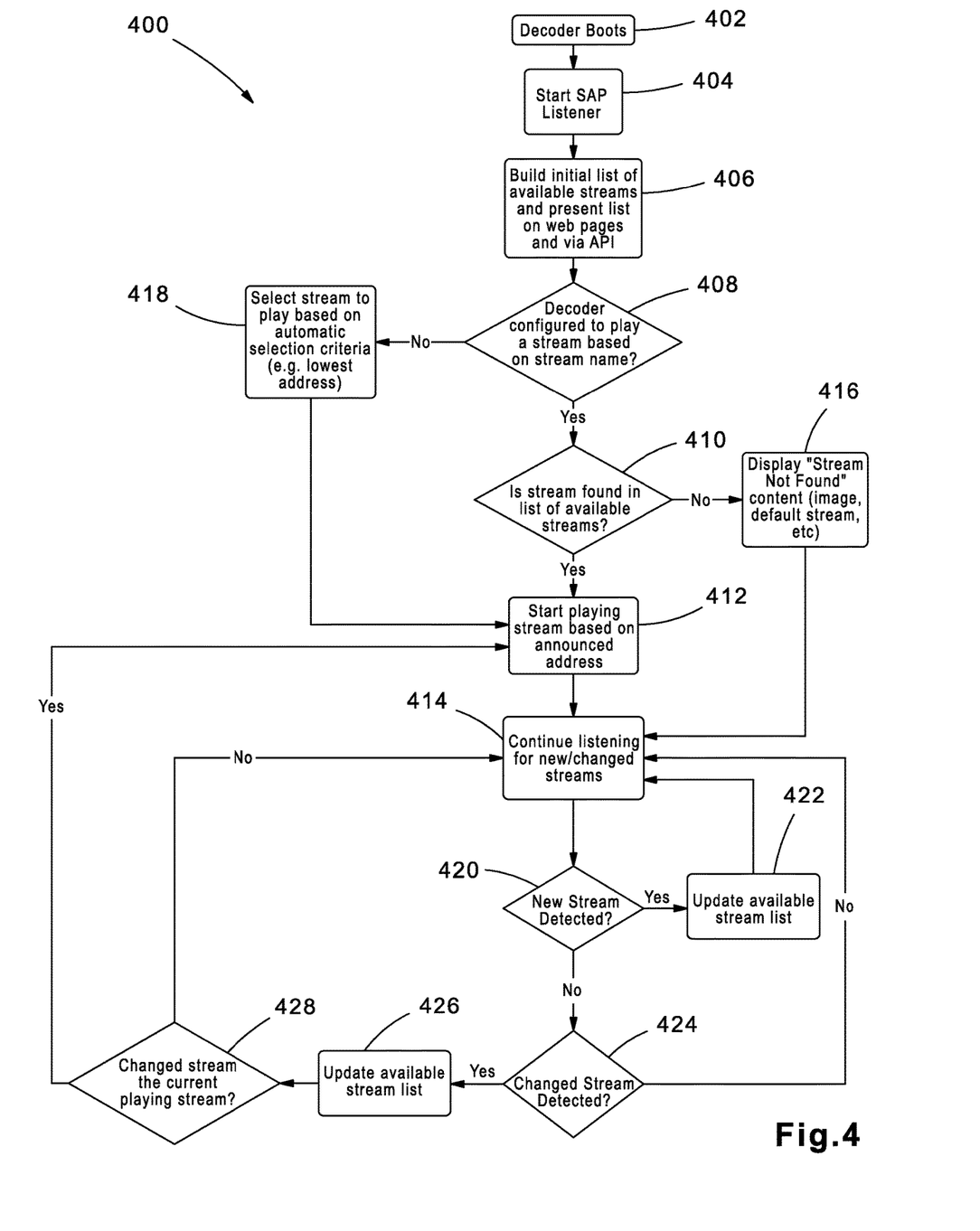
FIG. 4 is an exemplary flowchart illustrating an exemplary process for distributed automatic joining by stream name according to one non-limiting exemplary embodiment of the present disclosure.

In that regard, FIG. 4 is an exemplary flowchart 400 illustrating an exemplary process for distributed automatic joining by stream name according to one non-limiting exemplary embodiment of the present disclosure. As seen therein, and with continuing reference to the disclosure from FIG. 1, in an exemplary embodiment according to the present disclosure, the decoders 104 may be configured to include a "Join by Stream Name" process described by the flowchart 400, that may be enabled by default and may be configured as follows:

As an initial process, a unit (e.g., a decoder 104) within the networked AV system 100 may initiate a booting up process (402). For example, the booting process may be implemented when a new decoder 104 is being added to the networked AV system 100 for the first time, or when the decoder 104 is being restarted.

After the decoder 104 boots (402), if the "Join by Stream Name" algorithm 400 is enabled on the decoder 104, the decoder 104 is configured to listen for SAP announcements (404), and further configured to build an initial list of available streams based on the listened SAP announcements (406). The decoder 104 may have a web page configured to present via an HMI or I/O device a list of streams to join (406) and the user may select a stream from this list. That is, users may specify a stream to decode using the channel name. In that regard, an Application Program Interface (API) call may be provided to set the stream name from a control system.

The decoder 104 is configured to persist a channel name so that the decoder 104 will return to decoding that channel after a reboot. In that regard, if the decoder 104 is configured to play a stream based on a stream name (408), and if that stream is found in the list of available streams (410), then the decoder 104 is configured to start playing such a stream based on the announced address (412). Thereafter, the decoder 104 is configured to continue listening for new or changed streams (414).

Alternatively, if the decoder 104 is configured to play a stream based on a stream name (408), and if that stream is not found in the list of available streams (410), then the decoder 104 may be configured to display "Stream Not Found" content to a user (e.g., image, default stream, etc.)(416). Thereafter, the decoder 104 may be configured to continue listening for new or changed streams (414).

Moreover, if the decoder 104 is not configured to playa stream based on a stream name (e.g., it is a new decoder 104 and no channel name is stored on the unit) (408), the decoder 104 is configured to automatically join a stream by selecting a stream based on automatic selection criteria (e.g., the stream with the lowest alphanumeric address)(418). After automatically joining a stream in such a fashion (418), the decoder 104 is configured to start playing such a stream based on the announced address (412) and to continue listening for new or changed streams (414).

As previously described, after the decoder 104 starts playing a stream based on the announced address (412), the decoder 104 may be configured to continue listening for new or changed streams (414). If a new stream is detected (420), the decoder 104 is configured to update the list of available streams (422) and continue listening for new or changed streams (414).

In that regard, if a new stream is not detected (420), the decoder 104 is configured to detect a changed stream (424). If the multicast address of a stream changes (424), the decoder 104 is configured to update the list of available streams (426), and to determine whether the changed stream is the current playing stream (428). If so, the decoder 104 is configured to start and/or continue playing such a stream based on the announced address (412). If not, the decoder 104 is configured to continue listening for a new or changed stream (414) and move to that new address upon receiving the new information via an SAP message.

It should be noted that each of the encoders 102 and decoders 104, including controllers 110, and/or any other unit, device, switch 106, controller 110, system, subsystem, module, mechanism, component or the like described herein may comprise appropriate circuitry, such as one or more appropriately programmed processors (e.g., one or more microprocessors including central processing units (CPU)) and associated memory or data storage medium 112 which may include stored operating system software and/or application software executable by the processor(s) for controlling operation thereof and for performing the particular algorithms represented by the various functions and/or operations shown and described herein, including interaction and/or communication between and/or cooperation with each other. One or more of such processors or several such processors and/or circuitry and/or hardware may be distributed among several separate units, devices, switches, controllers, systems, subsystems, modules, mechanisms, components or the like.

With the encoders 102 and/or decoders 104 configured according to the present disclosure with one or more of the three parts described herein, the installation of networked AV equipment is greatly simplified. The networked AV system 100 comprising devices of the present disclosure also automatically adapts to changes, and it will also work if any devices in the system are manually configured. It is also noted that, in one alternative embodiment, stream channel numbers may be automatically assigned and then channel numbers may be mapped to multicast addresses. It is further noted that, in other alternative embodiments, any suitable protocol for announcing stream information may be used as an alternative to SAP, which could include a proprietary protocol, and with which the encoders 102 and/or decoders 104 would be configured to work.

The present disclosure thus describes a device and method for distributed automatic multicast address assignment in the networked AV system 100 that solves, addresses, eliminates and/or mitigates some or all of the problems and/or issues associated with the current approaches described above. As is readily apparent from the foregoing, various non-limiting embodiments of a device and method for distributed automatic multicast address assignment in the networked AV syslerm 100 have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A device for automatic multicast address assignment and conflict resolution for audio-visual (AV) streams multicast over a networked AV system, the device associated with a source for generating an AV stream, the device comprising:
   a controller; and
   a memory in communication with the controller, the memory comprising a non-transitory computer readable storage medium having stored executable instructions, wherein execution of the instructions causes the controller to:
      monitor the networked AV system for messages associated with AV streams multicast over the networked AV system;
      build a table in the memory, the table having a multicast address associated with each AV stream multicast over the networked AV system based on the messages associated with the AV streams;
      automatically randomly select a preliminary multicast address from a defined range of addresses;
      compare the preliminary multicast address selected to the multicast addresses in the table;
      repeat automatically randomly select a preliminary multicast address from a defined range of addresses when the preliminary multicast address selected conflicts with a multicast address in the table; and
      automatically assign the preliminary multicast address selected for association with the AV stream generated by the source associated with an encoder when the preliminary multicast address selected does not conflict with a multicast address in the table.

2. The device of claim 1, wherein the device is the encoder.

3. The device of claim 1, wherein the messages associated with AV streams comprise Session Announcement Protocol messages broadcast by other encoders, each message comprising information about a stream name and an associated multicast address for an AV stream generated by a source associated with the encoder.

4. A method for automatic multicast address assignment and conflict resolution for audio-visual (AV) streams multicast over a networked AV system, the method performed by a device associated with a source for generating an AV stream, the device having a controller and an associated memory, the method comprising:
   monitoring the networked AV system for messages associated with AV streams multicast over the networked AV system;
   building a table in the memory, the table having a multicast address associated with each AV stream multicast over the networked AV system based on the messages associated with the AV streams;
   automatically randomly selecting a preliminary multicast address from a defined range of addresses;
   comparing the preliminary multicast address selected to the multicast addresses in the table;
   repeating automatically randomly selecting a preliminary multicast address from a defined range of addresses when the preliminary multicast address selected conflicts with a multicast address in the table; and
   assigning the preliminary multicast address selected for association with the AV stream generated by the source associated with an encoder when the preliminary multicast address selected does not conflict with a multicast address in the table.

5. The method of claim 4, wherein the device is the encoder.

6. The method of claim 4, wherein the messages associated with AV streams comprise Session Announcement Protocol messages broadcast by other encoders, each message comprising information about a stream name and an associated multicast address for an AV stream generated by a source associated with the encoder.

7. A device for automatically joining an audio-visual (AV) stream multicast over a networked AV system, the device associated with a destination for receiving an AV stream, the device comprising:
   a controller; and
   a memory in communication with the controller, the memory comprising a non-transitory computer readable storage medium having stored executable instructions, wherein execution of the instructions causes the controller to:
      monitor the networked AV system for messages associated with AV streams multicast over the networked AV system;
      build a list in the memory, the list including a name and an associated multicast address for each AV stream multicast over the networked AV system based on the messages associated with the AV streams;
      automatically join an AV stream having a name found in the list based on the associated multicast address;
      store the name of the AV stream automatically joined in the memory as a previously joined AV stream; and
      automatically join the previously joined AV stream after a reboot of the device.

8. The device of claim 7, wherein the device is a decoder.

9. The device of claim 7, wherein the messages associated with AV streams comprise Session Announcement Protocol messages broadcast by encoders, each message comprising information about a stream name and an associated multicast address for an AV stream generated by a source associated with an encoder.

10. The device of claim 7, wherein the name of the AV stream automatically joined is manually selected by a user from the list.

11. The device of claim 7, wherein the name of the AV stream automatically joined is automatically selected from the list based on a selection criterion.

12. The device of claim 7, wherein execution of the instructions further causes the controller to:
detect a change in the multicast address associated with the name of the automatically joined AV stream; and
automatically move to the changed multicast address associated with the name of the automatically joined AV stream to continue decoding the automatically joined AV stream.

13. A method for automatically joining an audio-visual (AV) stream multicast over a networked AV system, the method performed by a device associated with a destination for receiving an AV stream, the method comprising:
monitoring the networked AV system for messages associated with AV streams multicast over the networked AV system;
building a list including a name and an associated multicast address for each AV stream multicast over the networked AV system based on the messages associated with the AV streams;
automatically join an AV stream having a name found in the list based on the associated multicast address;
storing the name of the AV stream automatically joined as a previously joined AV stream; and
automatically joining the previously joined AV stream after a reboot of the device.

14. The method of claim 13, wherein the device is a decoder.

15. The method of claim 13, wherein the messages associated with AV streams comprise Session Announcement Protocol messages broadcast by encoders, each message comprising information about a stream name and an associated multicast address for an AV stream generated by a source associated with an encoder.

16. The method of claim 13, wherein the name of the AV stream automatically joined is manually selected by a user from the list.

17. The method of claim 13, wherein the name of the AV stream automatically joined is automatically selected from the list based on a selection criterion.

18. The method of claim 13 further comprising:
detecting a change in the multicast address associated with the name of the automatically joined AV stream; and
automatically moving to the changed address associated with the name of the automatically joined AV stream to continue decoding the automatically joined AV stream.

* * * * *